June 23, 1925.
M. BENSON ET AL
1,543,273
POWER FLUID AND METHOD OF PRODUCING SAME
Filed April 2, 1921
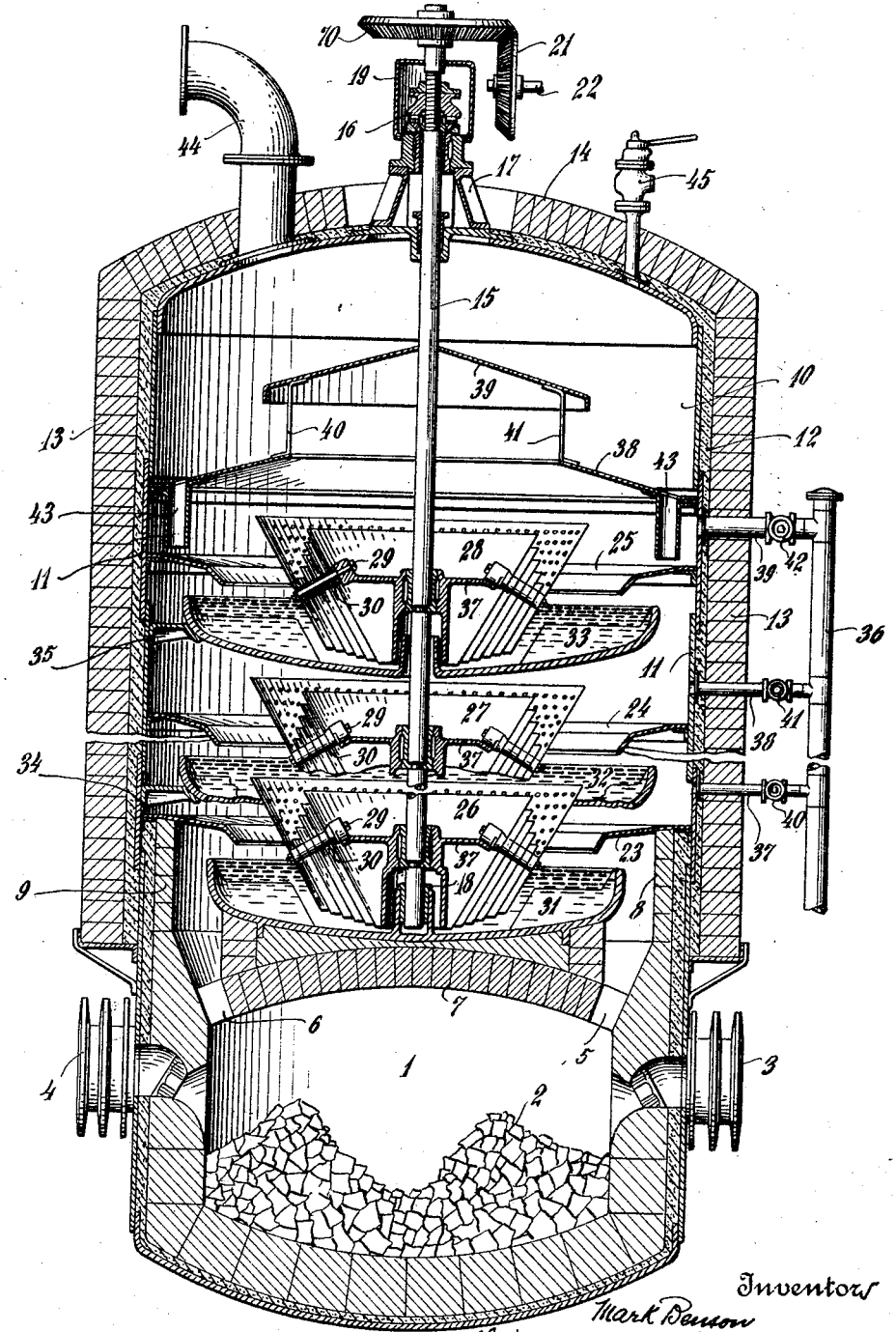

Patented June 23, 1925.

1,543,273

UNITED STATES PATENT OFFICE.

MARK BENSON, OF NEW YORK, N. Y., AND FREDERICK H. WAGNER, OF BALTIMORE, MARYLAND; SAID WAGNER ASSIGNOR TO SAID BENSON.

POWER FLUID AND METHOD OF PRODUCING SAME.

Application filed April 2, 1921. Serial No. 457,903.

*To all whom it may concern:*

Be it known that we, MARK BENSON, a citizen of the Republic of Czechoslovakia, and FREDERICK H. WAGNER, a citizen of the United States, and, respectively, residing at New York, county and State of New York, and Baltimore, in the county of Baltimore and State of Maryland, have invented certain new and useful Improvements in Power Fluids and Methods of Producing Same, of which the following is a specification.

Our invention relates to power plants and has for its object a new method of producing a power fluid adapted to be used for the operation of prime movers, which object we accomplish by a better utilization of the heat units in the heating medium (fuel) than has been heretofore accomplished. Because of the great economy in fuel involved in our new method this greater utilization of the heat units, or in other words, the better and more economical heat transfer is of the highest importance especially at a time, when the cost of fuel production has so much increased; even in steam-generators of the most modern types the losses in heat units are considerable because of the heat being transferred indirectly through metal parts and also because of the storing of the heat energy before use, not to mention other factors, as for instance the expense of installation, large floor space, and the expenses of operation and maintenance of the ordinary steam power plant.

In our new method for producing a power fluid, a far more economical and therefore better utilization of the heating units of the heating medium (fuel) is obtained, because, according to our method, heat is directly transferred from the heating medium, or products of combustion, to the water or other liquids, which is used in the production of our new power fluid, without the intervention of metal parts, as in the ordinary steam generators. This manner of direct heat transfer results not only in a considerable economy in the use of all kinds of fuels but also in a more economical distribution of heat.

In carrying out our invention, we burn a suitable fuel with air or oxygen, or a mixture of the two (enriched air) under pressure and then bring the products of combustion in direct contact with water under a lower pressure than that under which the combustion occurred. The water with which the combustion products are brought in direct contact is preferably in the form of a fine spray so as to insure instantaneous vaporization and an intimate mixture with the products of combustion. Thus, our new power fluid consists of the products of combustion of a suitable fuel either partially or completely saturated with water vapor.

The difference in pressure referred to may be any practical pressure drop sufficient for the movement of the combustion products from the place of combustion through the saturating zone to the prime mover.

While our invention is applicable to gaseous, liquid and solid fuels, the latter especially in a powdered state, it is most readily applicable for use with gaseous or liquid fuels which are easily vaporized or atomized.

Moreover, while in the accompanying drawing we have illustrated one manner of carrying out our invention which we shall presently describe, we do not limit ourselves of course to this particular manner, because many modifications regarding construction and operation will readily suggest themselves to those skilled in the art. Such modifications for instance, relate to the production, mixing, introduction and ignition of the combustible and the air.

Also the heat exchange between the combustion products and the water is capable of many modifications.

In the drawing, we have shown a tower divided into a plurality of superposed compartments, the tower being shown in vertical section to clearly show the entire construction. The figure shows part of the tower broken away for lack of space.

The heat is generated in the combustion chamber 1 containing the fuel 2 by means of the surface combustion burners 3, 4, arranged on opposite sides of the combustion chamber. The products of combustion pass upwards through the openings 5, 6 in the arch 7, made of fire-brick, or other heat resisting material, which is also used as a lining for the combustion chamber so that very high temperatures under pressure can be produced.

The walls of the combustion chamber are extended upward at 8, 9, and this part is surrounded by a tower 10 preferably of circular cross-section and built up of steel-plates 11 riveted, or otherwise firmly secured together so as to form a strong solid structure adapted to resist pressure. The steel-plates are lined on the outside with heat-insulating material 12, which in turn is surrounded by brick-work so that there are no heat losses by radiation. Through an opening in the roof 14 of the tower passes a shaft 15 extending vertically through the center of the tower. At its upper end, the shaft 15 is journalled in an anti-friction bearing shown as a whole at 16 and supported by a standard 17 resting on the top of the tower. At its lower end, the shaft 15 is journalled in a step bearing 18. The antifriction bearing 16 at the top is enclosed in a dust-proof casing 19. Rotation is imparted to the shaft by means of bevel-gears 20, 21, the gear 20 being fastened to the shaft 15, and the gear 21 to a shaft 22 which may be driven from any suitable source of power so as to rotate the shaft 15 at a high rate of speed.

The tower is divided by partitions 23, 24, 25 etc. into a plurality of separate chambers one above the other. The said partitions have large central openings, which openings are occupied each by a set of concentric frustrums of cones, indicated at 26, 27, 28. The cones of each set are held firmly together by bolts 29, the latter carrying spacing collar 30 for maintaining the cones of each set in spaced relation. The number of cones of each set varies with the size of the entire apparatus. The wall of the outer largest cone is provided with fine perforations as shown. The various sets of cones are secured by spiders 37 to the central vertical shaft 15 so as to rotate therewith.

Below each set of cones is arranged in each chamber an open vessel 31, 32, 33 respectively, the cones extending into these vessels which are filled with water, or any other suitable liquid. As shown, the spacing between the bottom of each vessel and the bottom edges of the cones increases toward the outer cone to provide for the equable immersion of the cones in the liquid. The lowermost vessel 31 is supported by the fire-arch 7, whereas the other vessels are carried by brackets, 34, 35 projecting from the inner wall of the steel shell, one bracket only being shown in each chamber.

The water, or other liquid, is fed into the various chambers through the supply pipe 36 from which project branches 37, 38, 39 extending through the wall of the tower 10. In each branch-pipe is arranged a regulating valve 40, 41, 42 respectively. The water, or other liquid, flows over the partitions, 23, 24, 25 into the vessels 31, 32, 33. The supply-pipe 36 is connected with a feed-pump not shown.

A baffle plate 38 is arranged above the topmost chamber, above which baffle plate is disposed a hood 39 supported on the baffle plate 38 by arms 40, 41 and acting as an additional baffle. On opposite sides, there are provided in the baffle plate 38 ports 43 for the ascending mixture of combustion products and vaporized liquid, for which in the roof of the tower there is provided an outlet 44. At 45 is provided a safety-valve.

The operation will be readily understood. The shaft 15 being set in rotation at a high rate of speed, the various sets of cones are moving with a great circumferential velocity picking up the water, or other liquid, in the stationary vessels and throwing the water with considerable force and speed through the outer perforated cone, where additional impetus is given to the water by the higher rim-speed of said cone. The water is thus projected through the space filled with the ascending combustion products in the form of a fine spray, travelling with great velocity and upon impact with the inner wall of the steel-shell 10 being converted into a fog. In this manner, a most intimate contact and mixture between the water and the combustion products is effected. The water escapes through the perforations of the outer cone in small globules which by their impact against the inner wall of the steel-shell 10 are broken up into an infinite number of the smallest drops whereby the extent of contact with the combustion products and thereby also the total surface presented to the action of the combustion products are considerably increased. By this intimate mixture of combustion products and water, or other suitable liquid, a new power fluid is produced, which through the outlet 44 passes to the place of consumption.

The advantages of direct heat transfer from the combustion products to the water, or other liquid, of the instantaneous vaporization, because of the greater penetration of the heat of the combustion products, of the principle of counter-flow, of the great economy in installation cost and power consumption and of the considerable saving in floor space are obvious.

Any water or liquid particles entrained in the ascending current are caught by the baffle plates 38 and 39 and are returned to the top compartment.

We claim:

1. In an apparatus for producing a power fluid, the combination of a combustion chamber for burning a fuel under high pressure, a heat insulated compartment in communication with the said combustion chamber, an open vessel in the said compartment adapted to receive a liquid to be vaporized, a means for continuously supplying the said open vessel with fresh liquid, a means for withdrawing the liquid from the said open vessel and completely atomizing it, thereby effecting its intimate contact with the products of combustion and causing its instantaneous vaporization, and an outlet for the mixture of vapors and the products of combustion.

2. In an apparatus for producing a power fluid, the combination of a combustion chamber for burning a fuel under high pressure, a heat insulated tower disposed above the said combustion chamber and being in communication therewith, open partitions in the said tower forming compartments in communication with each other, an open vessel in each of the said compartments, means for continuously supplying the said vessels with liquid to be vaporized, a centrifugally acting means for withdrawing the liquid from the said open vessels and at the same time converting it into a highly atomized state, thereby causing its intimate mixture with the rising products of combustion, turning the liquid into vapor, means for operating the said centrifugally acting means, and an outlet for the mixture of vapor and products of combustion.

3. An apparatus as set forth in claim 2, comprising a baffle plate above the top-most compartment for returning the unvaporized liquid to the said open vessel.

4. An apparatus for producing a power fluid, comprising a combustion chamber for burning fuel under high pressure, a heat insulated tower disposed above the said combustion chamber and being in communication therewith, open partitions dividing the said tower into compartments in communication with each other, an open vessel in each of the said compartments, means for continuously supplying the said vessels with liquid to be vaporized, centrifugally acting devices for withdrawing the liquid from the said open vessels at the same time converting it into a highly atomized state, a shaft extending through the said tower and carrying the said centrifugally acting devices, bearings for the said shaft, means for revolving the said shaft at a high rate of speed and an outlet for the mixture of vapor and products of combustion.

5. An apparatus for producing a power fluid, comprising a combustion chamber for burning fuel under high pressure, a heat insulated tower disposed above the said combustion chamber and being in communication therewith, horizontal partitions in the said tower forming compartments in communication with each other, an open vessel in each of the said compartments, means for continuously supplying the said vessels with liquid to be vaporized, a shaft extending centrally through the said tower, bearings for the said shaft, means for revolving the said shaft at a high rate of speed, sets of spaced concentric frustrums of cones carried by the said shaft, one set for each compartment, the outermost cone of each set being provided with small perforations for converting the liquid into a highly atomized state, and an outlet for the mixture of vapor and the products of combustion.

MARK BENSON.
FREDERICK H. WAGNER.